United States Patent [19]

Suzuki

[11] Patent Number: 5,263,384
[45] Date of Patent: Nov. 23, 1993

[54] MOVING STAGE
[75] Inventor: Motohiko Suzuki, Tokyo, Japan
[73] Assignee: Olympus Optical Co., Ltd., Tokyo, Japan
[21] Appl. No.: 837,829
[22] Filed: Feb. 18, 1992
[30] Foreign Application Priority Data Feb. 20, 1991 [JP] Japan .................. 3-14339[U]

[51] Int. Cl.[5] ............................................. G02B 21/26
[52] U.S. Cl. ............................. 74/479 MF; 359/393;
33/1 M; 108/137; 248/178; 269/71; 424/749
[58] Field of Search ..... 74/479 M, 479 MF, 479 ML,
74/479 MM, 89.2, 89.22; 33/1 M; 108/137, 143;
359/393; 248/178, 184, 661; 414/749; 269/71,
73; 384/10, 125, 215, 220, 222

[56] References Cited
U.S. PATENT DOCUMENTS

| 4,189,953 | 2/1980 | Volk | 359/393 X |
| 4,402,576 | 9/1983 | Stahl et al. | 359/393 |
| 4,700,585 | 10/1987 | Marzhauser | 359/393 X |

FOREIGN PATENT DOCUMENTS

| 3345570 | 7/1985 | Fed. Rep. of Germany | 359/393 |
| 8019465 | 10/1985 | Fed. Rep. of Germany | |
| 51-44823 | 12/1976 | Japan | |
| 61-198206 | 9/1986 | Japan | |
| 703762 | 2/1954 | United Kingdom | |

OTHER PUBLICATIONS

Patent Abstracts of Japan, vol. 10, No. 193; Jul. 8, 1986.

Primary Examiner—Leslie A. Braun
Assistant Examiner—William G. Trousdell
Attorney, Agent, or Firm—Frishauf, Holtz, Goodman & Woodward

[57] ABSTRACT

A moving base is provided relative to a stage base fixed to a microscope's body and is movable in a linear direction with a specimen placed thereon. A drive wheel coaxial with an operation handle is mounted on the stage base such that it is rotatable. A rail is mounted relative to a mount face of a moving base with an elastic member therebetween such that it is fixed at both ends. The rail is placed in pressure contact with a V groove of the drive wheel by an elastic force of the elastic member. Even if there occur warping of the rail and eccentric state of the drive wheel, the elastic member is correspondingly deformed elastically so that the state of contact of the rail with the drive wheel is uniformly controlled by an elastic force of the drive wheel.

11 Claims, 11 Drawing Sheets

MOVING STAGE

BACKGROUND OF THE INVENTION

1. Field of the Invention

The present invention relates to a moving stage used in a microscope, etc., and movable in one direction (X or Y direction) or two (X and Y directions) directions.

2. Description of the Related Art

The moving stage for microscope, etc., employs a rack/pinion mechanism as its common drive mechanism. In this case, the accuracy with which the rack and pinion are manufactured and assembled together adversely affects the accuracy with which a moving base is driven.

If, for example, there occur warping of the rack and eccentric state of the pinion, or if the extent of paralleling is not adequate in the direction in which a moving base is moved, then the engagement of the pinion with the rack is adversely affects, causing tightening or loosening of these two members and hence an irregular movement of the moving base.

In order to improve these reliability problems, for example, Published Examined Japanese Patent Application 51-44823 proposes a method using a rack of split type and Published Unexamined Utility Model Application H-1-17725 proposes a method using a leaf spring provided between a moving base and a rack.

In the related engineering field, semiconductor wafers, liquid crystal, etc., have become a large-sized in recent years and larger microscopes are also required for inspection. A larger moving stage results in a longer rack. In order to smoothly move the moving base, however, much difficulty has been encountered in manufacturing longer racks accurately or in assembling a rack accurately in a direction parallel to that in which the moving base is moved. Further, the rack/pinion mechanism causes tear and wear at the teeth of the rack and pinion and, if dust or powder resulting from the worn teeth falls on the test specimen, defective products are produced.

In the larger moving stage for the microscope for use in the step of inspecting a semiconductor, it has been proved useful, from the standpoint of manufacture and use, to adopt a frictional drive mechanism, comprised of a toothless straight rail and drive wheel, in place of the conventional rack/pinion mechanism. The rail, if being comprised of a narrowly drawn wire in particular, can be obtained at low cost.

Figure 9A:
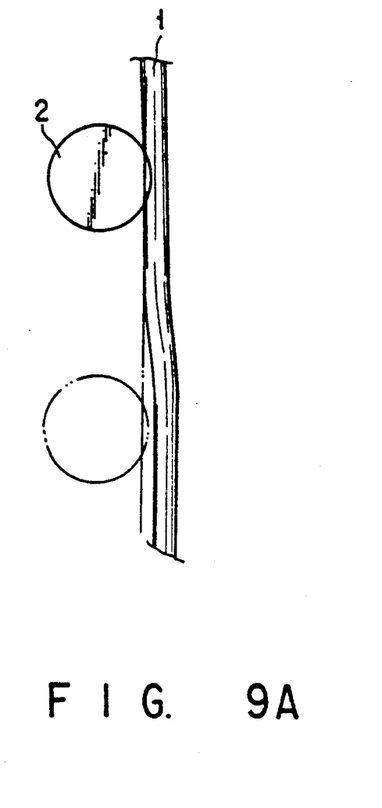

Even in the case of a frictional drive mechanism having the toothless straight rail and drive wheel, if there occurs warping or bending of the rail 1 as shown in FIG. 9A or if an eccentric state occurs at the drive wheel 2, or if an adequate extent of flatness is not achieved at a mount face on which the rail is mounted or if an adequate extent of paralleling is not achieved in a direction in which the moving base is moved (see FIG. 9B), then a partial tightening or loosening occurs at these engaged areas between the rail 1 and the drive wheel 2 as in the case of the aforementioned rack/pinion mechanism so that some inconvenience is involved at the time of operation. In this case it is not possible to, unlike the aforementioned rack, provide a split type groove in a narrow rail, such as a wire. It is necessary that, in order to urge the rail 1 toward the drive wheel 2 with the use of a leaf spring, the rail be supported by a plate seat made up of a rigid body and the plate seat be urged by a leaf spring, etc. In order to maintain the rigidity of the plate seat supporting a very long rail or wire in the larger moving stage, the cross-section of the plate seat has to be made great, thus leading to an increase in size of the plate seat and in manufacturing cost.

Figure 10:
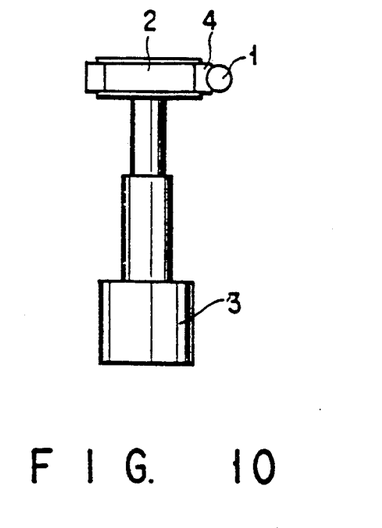
FIG. 10 is a view showing another structure.

There is also a method for urging the drive wheel 2 toward the rail 1 by an elastic member. In this case, accuracy in manufacturing and assembly of these component parts is required, resulting in an increase in cost and an increase in the number of component parts involved. In a structure as shown in FIG. 10, a rail 1 is pressed by an elastic member 4 bonded to the outer periphery of a drive wheel 2 mounted integral with an operation handle 3. Such a structure has a drawback in that, when the operation handle 3 is released from the operator's hand after the rotation of the drive wheel 2 has been stopped, a bounce occurs on the "moving base" side due to the elasticity of the elastic member 4. If, therefore, the moving base is positionally so displaced in the case where it is actually applied to a microscope, the specimen is, together with the moving base, displaced as one unit, resulting in a displacement of an observation image.

SUMMARY OF THE INVENTION

It is accordingly the object of the present invention to provide a low-cost moving stage which is effective to a larger type microscope in particular and can move a moving base smoothly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 4A to 4C show a positional relation of the rail and elastic member to a drive wheel: FIG. 4A showing the warping of the rail, FIG. 4B showing the eccentric state of the drive wheel and FIG. 4C showing a nonparallel state of the drive wheel and rail;

FIGS. 7A to 7E show a second embodiment of the present invention, in which FIG. 7A is a perspective view of whole device, FIG. 7B is an enlarged perspective view of the part, FIG. 7C is a cross-sectional view, as taken along line 7c—7c in FIG. 7A, FIG. 7D is a view showing a drive wheel and rail which are engaged, and FIG. 7E is a view showing the drive wheel and said which are not engaged.

FIGS. 8A to 8C show a relation of rails to a drive wheel: FIG. 8A showing the second embodiment of the present invention and FIGS. 8B and 8C showing the conventional counterparts;

FIGS. 9A and 9B show a relation of a drive wheel and rail in a moving stage: FIG. 9A showing the warping of the rail and FIG. 9B showing a non-parallel state of the rail and drive wheel;

FIGS. 11A and 11B show the use of an elastic member for a conventional rack/pinion mechanism: FIG. 11A showing the pinion as situated in the middle of the rack and FIG. 11B showing the pinion as situated near the end of the rack.

DETAILED DESCRIPTION OF THE PREFERRED EMBODIMENTS

A first embodiment of the present invention will be explained below with reference to FIGS. 1 and 2.

Figure 1:
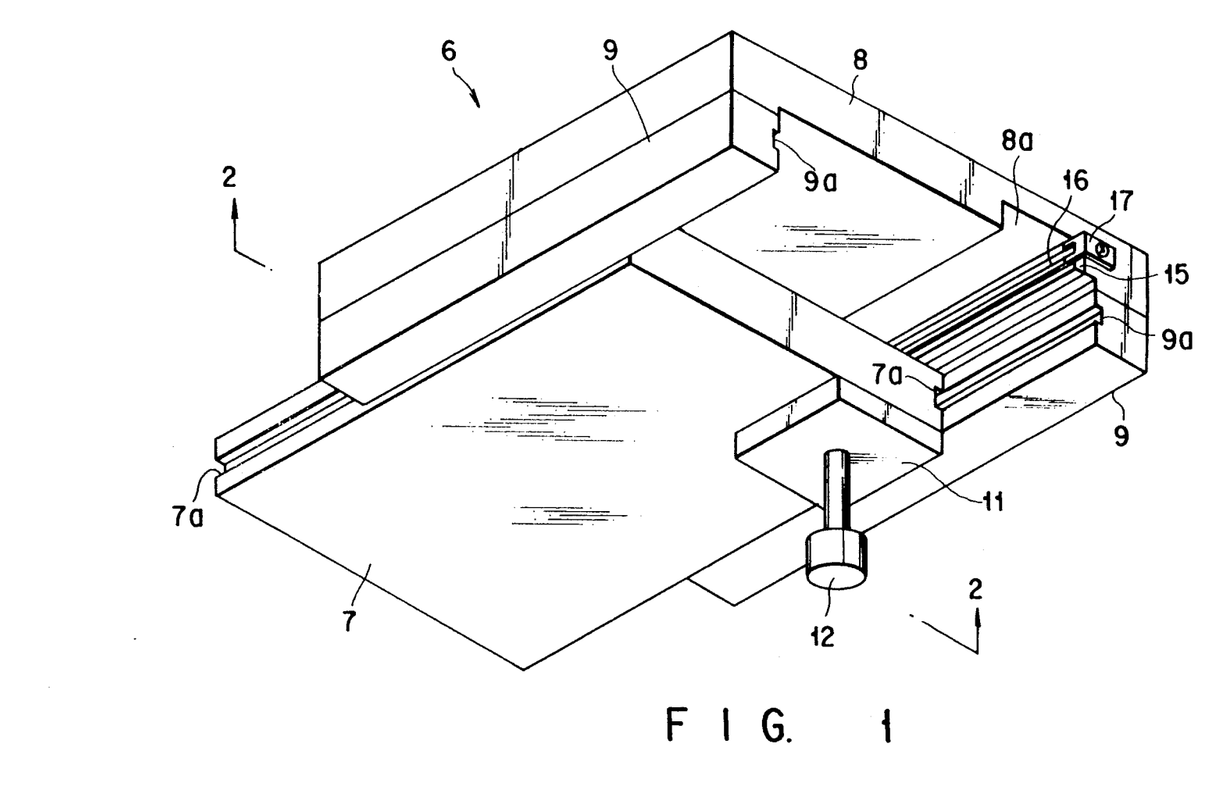
FIG. 1 is a perspective view showing a moving stage according to a first embodiment of the present invention.

FIG. 1 is a perspective view showing a moving stage 6. In FIGS. 1 and 2, reference numeral 7 shows a plate-like stage base fixed to a microscope body, not shown, and having a pair of guide grooves 7a on both side faces along its moving direction; 8, a moving base having a rectangular groove recess 8a provided in one side of its lower surface in an opposed relation to the stage base 7 and extending in the moving direction and a top surface on which a specimen is located; 9, a pair of guides fixed to both side of the lower surface of the moving base 8, extending along the moving direction and each having a guide groove 9a which faces the corresponding guide groove 7a; and 10, rollers or balls rotatably inserted between the guide grooves 7a, 9a to guide a smooth movement of the moving base 8 relative to the stage base 7 as clearly shown in FIG. 2. Such a guide mechanism is known as a cross roller guide VR type in which a roller cage incorporates precision rollers connected in an orthogonal relation to each other and used in combination with a 90° V groove face in a special track base. The roller guides in two row arrays are arranged in a parallel array so as to bear a load vertically acting, in all directions, upon a corresponding shaft. This type ca be preloaded readily and provides a slide mechanism of high rigidity and ensures a light movement without leaving a spacing.

Reference numeral 11 shows a handle mount seat member fixed to the undersurface of the stage base 7; 12, an operation handle rotatably supported on the handle mount seat member 11 such that its shaft 12a extends vertically through the stage base 7 and handle mount seat member 11; and 13, a drive wheel fixed, at a forward end of the shaft (see FIG. 2) 12a, coaxial with the operation handle 12 and situated in the groove recess 8a of the moving base 8 and having a V groove 13a in its outer peripheral surface.

Reference numeral 15 shows a plate-like elastic member supported on one surface side of the groove recess 8a in the moving base 8 and comprised of a rubber, such as chloroprene ruler whose spring hardness is, for example, 20° to 60°; 16, a rail or wire having a circular cross-section, extending on the surface of the elastic member 15 in a parallel relation and pushed against the V groove 13a of the drive wheel 13 by an elastic force of the elastic member 15; and 17, fixing members for supporting both longitudinal ends of the rail 16 and elastic member 15 to the moving base 8. Only one of the fixing members is shown in FIG. 1 for brevity's sake.

Here the way to support the rail 16 will be explained in more detail below.

Figure 3:
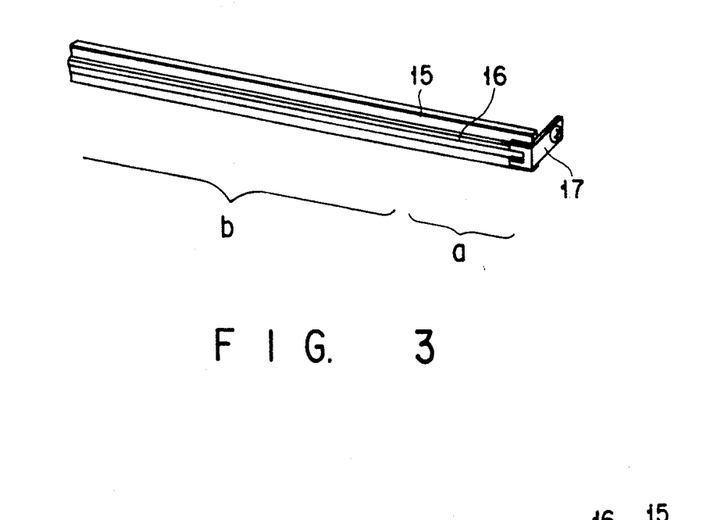
FIG. 3 is a perspective view showing end portions of a rail and an elastic member in the first embodiment of the present invention.

In order to achieve the degree of freedom with which the rail is deformed relative to a mount face 8b and to prevent the rail from sliding out of the moving base 8 due to its longitudinal displacement, the fixing member 17 is of such a comb-like, L-shaped type that, as shown in FIG. 3, the end portion of the rail 16 is fitted in a corresponding cutout of the fixing member 17.

Stated in more detail, the cutout is provided on the end portion of one arm of the L-shaped fixing member such that it extends along the ar of the L-shaped fixing member, that is, one end portion of the rail 16 is fitted in the cutout of the L-shaped fixing member to allow it to be shifted in its longitudinal direction so that the rail is not slipped out of the fixing member and thus the moving base 8. The elastic member 15 is held between the one arm of the L-shaped fixing member and the mount face 8b on one end side of the groove recess 8a in the moving base 8. The other arm of the fixing member 17 is secured to the corresponding end face of the moving base 8 by a fixing means, such as a screw means.

Further, it is preferable that the rail 16 be placed in contact with the drive wheel at a central section somewhat distant from both the ends of the fixing member 17. At a larger moving stage whose moving base 8, in particular, is moved over a distance of over 300 mm, any slight tilt of the rail 16 produces a greater positional displacement. It is, therefore, preferred that, in order to accommodate a greater warping of the rail 16, the rail 16 has a greater moving distance from the fixing member 17 up to a point of contact with the drive wheel 13 to provide a moving allowance of about 20 to 30 mm relative to a drive wheel sliding range as shown in FIG. 3.

In the present embodiment as set out above, when the moving base 8 is to be moved, the operation handle 12 is rotated, causing the drive wheel 13 which is mounted coaxial with the operation handle 12 to be rotated so that the rail 16 in pressure contact with the drive wheel 13 is frictionally drive in a linear motion and hence the moving base 8 integral with the rail 16 is moved in a linear motion while being guided by the rollers or balls 10.

Figure 4A:
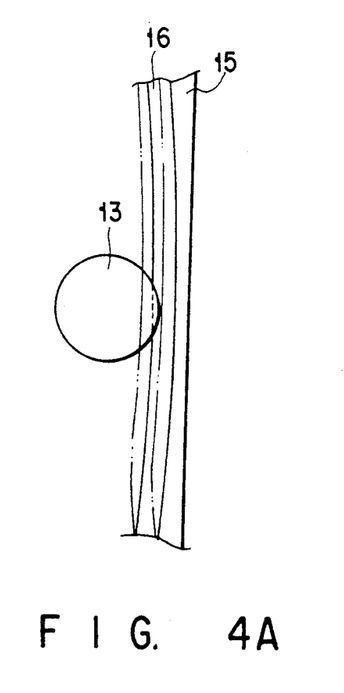
Figure 9B:
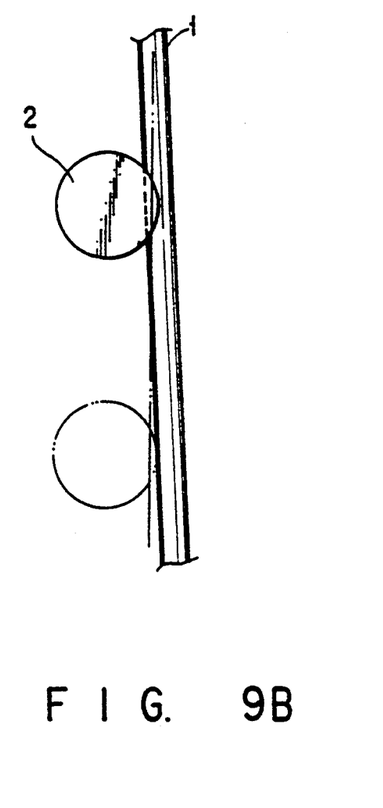

If the rail 16 is warped as shown in FIG. 4A, the strength of contact is increased or decreased, in a Structure of FIGS. 9A and 9B, in accordance with a corresponding slight warping of the rail, thus involving an uneven movement of the moving base. In the present invention, even if the rail 16 is flexed at an area of contact with the drive wheel 13, the rail 16 and elastic member 15 are elastically deformed in a manner to trace the drive wheel 13 so that it is possible to better maintain the state of contact of the rail 16 with the drive wheel 13 at all times and hence to achieve smooth movement of the moving base 8.

Figure 4B:
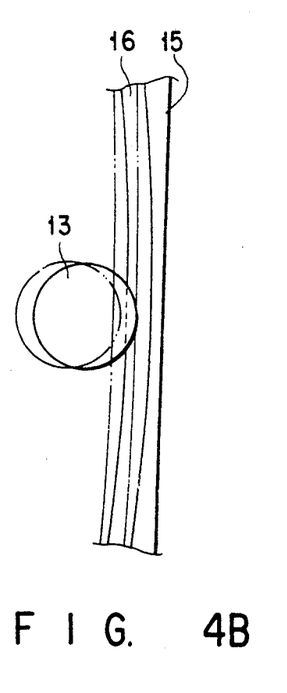
Figure 4C:
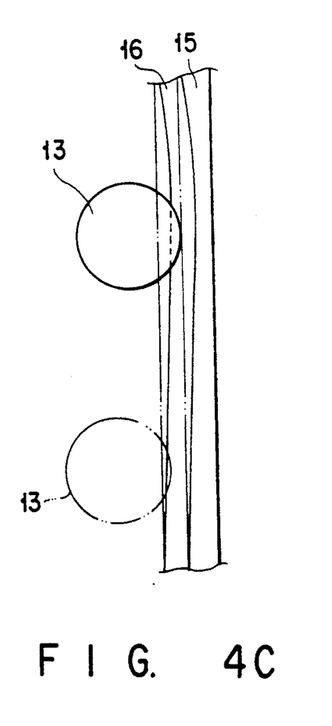

If the drive wheel 13 is eccentrically moved in a direction of the rail 16 as shown in FIG. 4B, the rail 16 and elastic member 15 are elastically deformed in accordance with an extent to which the rail 16 is pressed. This can maintain the state of better contact of the rail 16 with the drive wheel 13 in accordance with the extent of eccentricity. Further even in the cases where the extent of flatness of the mount face 80 is not adequate relative to the rail 16 and where the extent of paralleling of the moving base 8 is not adequate relative to the rail 16 as viewed in the direction of movement of the rail as shown in FIG. 4C, the strength of contact between the drive wheel 13 and the rail 16 is adjusted through the elastic deformation of the rail 16 and elastic member 15.

Figure 2:
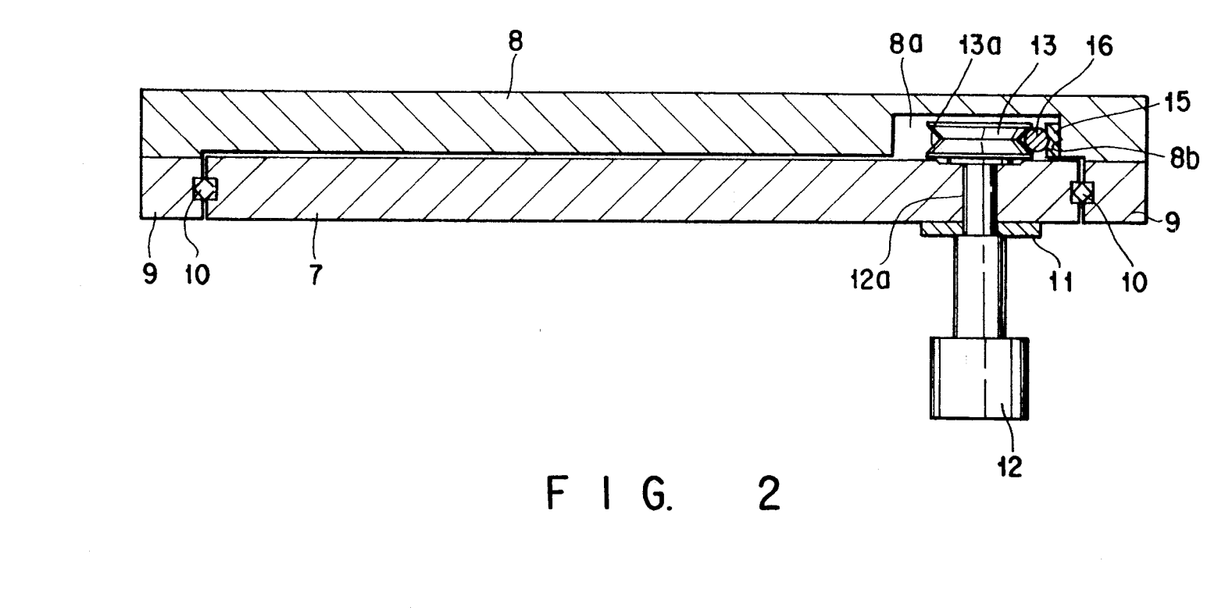
FIG. 2 is a cross-sectional view, as taken along line 2—2 in FIG. 1.
Figure 5:
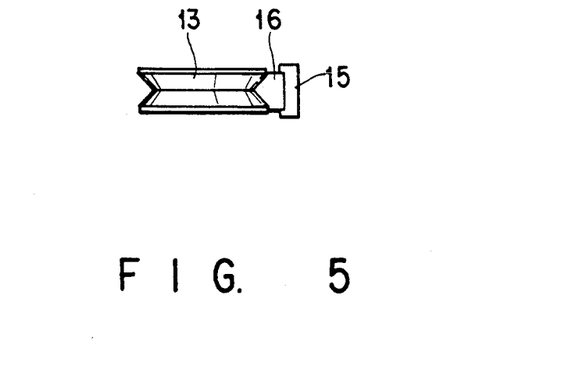
FIG. 5 is a cross-sectional view showing a variant of the rail.

Although the cross-section of the rail 16 is circular in this embodiment shown in FIG. 2, it is not restricted thereto and a proper cross-section can be adopted inserted. For example, as shown in FIG. 5, the portion of the rail 16 which contacts with the drive wheel 13 may be substantially triangular in cross-section with its vertical angle made at about 60° to 120°.

Figure 6:
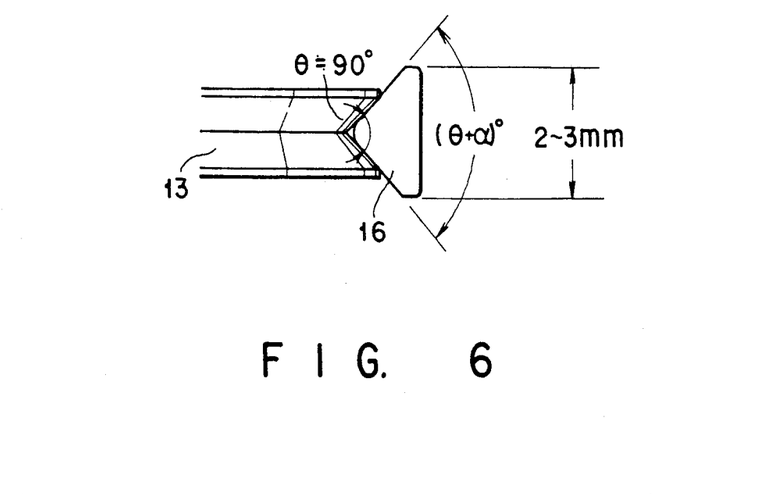
FIG. 6 is a view showing a relation of the cross-section of a rail to a V groove of a drive wheel.

Preferably, as shown in FIG. 6, the V groove 13a of the drive wheel 13 is made at an angle $\theta$ of about 90°, whereas the rail 16 may be formed of a drawn wire whose triangular cross-section is so set that the vertical angle is made at an angle somewhat greater than the angle of the V groove 13a, that is, at an angle $(\theta + \alpha)°$ at which the rail contacts with the V groove 13a of the drive wheel, and that the side face oppositely facing the vertical angle is made to have a width of about 2 to 3 mm.

Such a narrow rail 16 may be easily deformed.

If the rail 16 has a greater cross-section, it increases its rigidity and, undesirably, it fails to trace the drive wheel 13.

According to the present invention, it is not necessary to achieve stricter accuracy, as required in the conventional moving stage, with which the drive wheel 13 and rail 16 are manufactured and assembled together. It is, therefore, possible to achieve smooth movement of the moving base 8 at low costs without the need of achieving such stricter accuracy as required in the conventional art.

Although, in the aforementioned embodiment, the drive wheel 13 and rail 16 have been explained as being provided on the stage base 7 and moving base 8, respectively, it may be possible to provide the drive wheel 13 and rail 16 on the moving base 8 and stage base 7, respectively.

The moving stage of the present invention can be applied to such a type as to be able to move the moving base in two directions, that is, X- and Y-directions as will be set out below in connection with a second embodiment of the present invention.

Figure 7A:
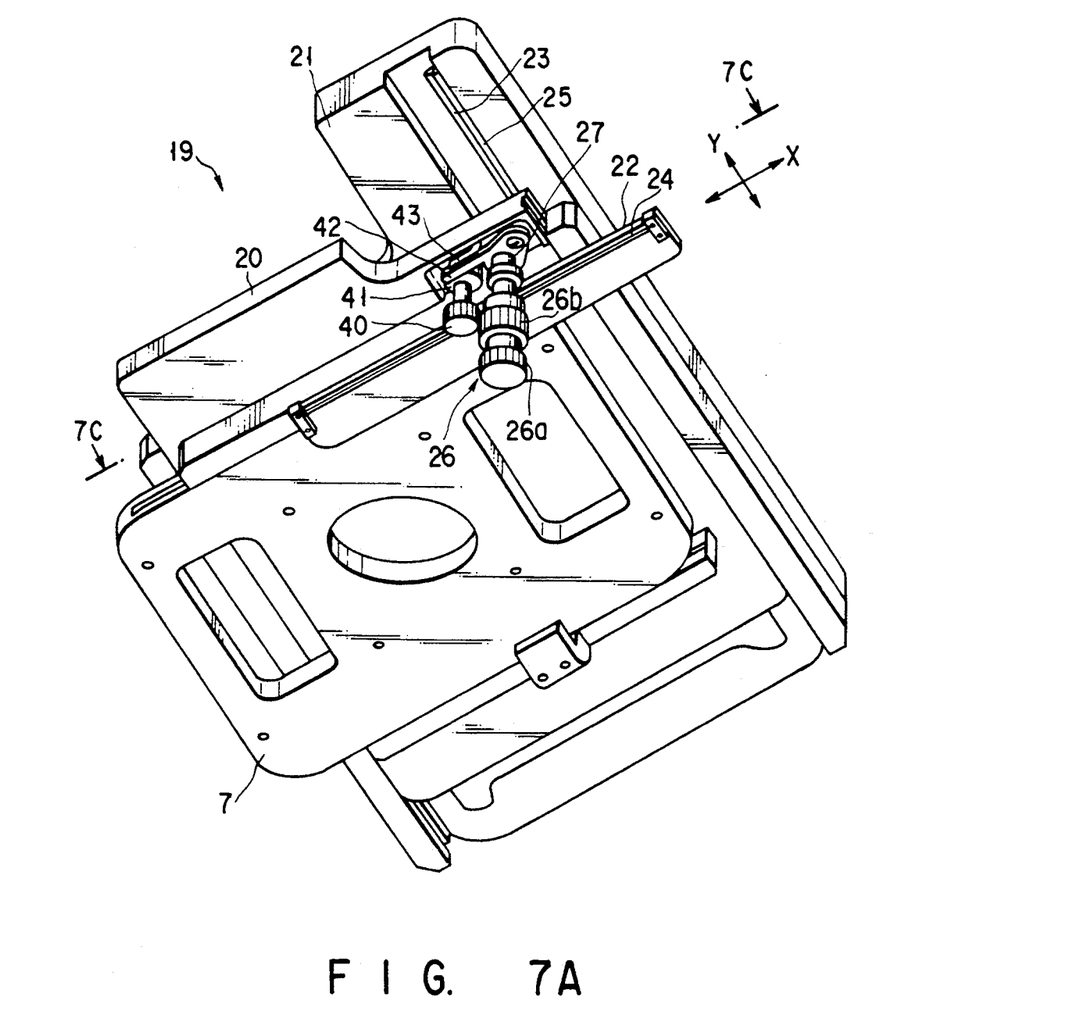
Figure 7B:
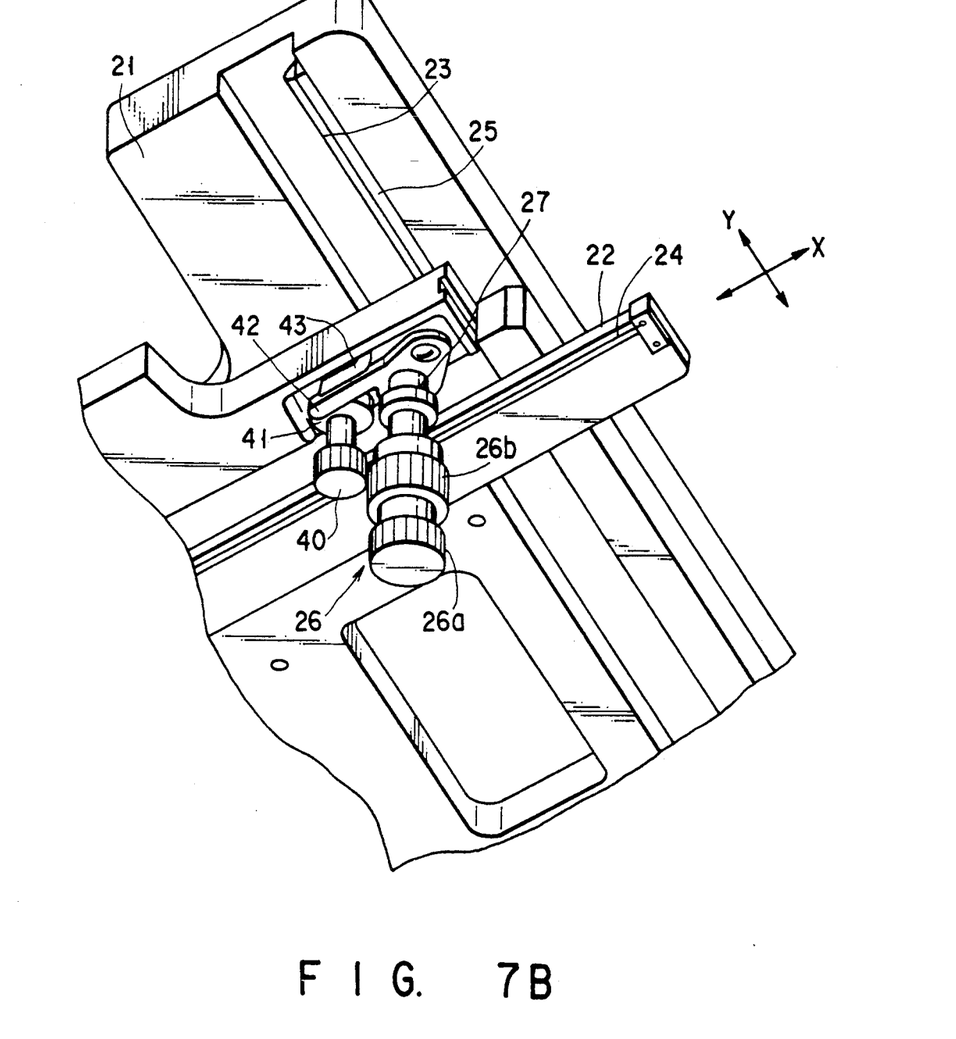
Figure 8A:
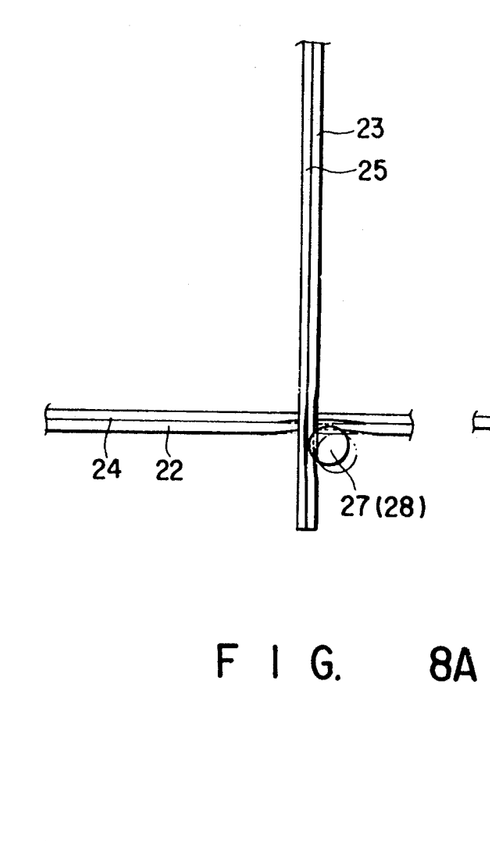

A moving stage 19 as set out above is of such a type that a first moving base 20 and second moving base 21 are provided, in that order, over a stage base 7 fixed to a microscope body and are movable in the X and Y directions. First and second rails 22 and 23 are mounted on the stage base 7 and second moving base 21, respectively, and extend in the X and Y directions, respectively. Plate-like elastic members 24 and 25 are held one between the first rail 22 and an associated mount face and one between the second rail 23 and an associated mount face with both the ends of the elastic members 24 and 25 fixed by associated fixing members to the moving stage and second moving base, respectively. An operation handle 26 is rotatably supported on the first moving base 20 and extends in a direction vertical to the first moving base 20. The operation handle 26 is mounted concentric with a first drive wheel 27 in pressure contact with the first rail 22 and a second drive wheel 28 in pressure contact with the second rail 23 and located near an intersection of both the rails 22 and 23 as shown in FIG. 8A. First and second handles 26a and 26b are mounted on and coaxial with the operation handle 26 and adapted to rotate the first and second drive wheels 27 and 28, respectively.

In the present embodiment, the first and second drive wheels 27 and 28 can be moved to those contacting and noncontacting positions relative to the rails 22 and 23, as shown in FIG. 8A, through a clutch mechanism. By so doing, it is possible to coarsely move the moving stage 19 to the noncontacting position, that is, move the moving bases 20 and 21 directly by hand (without operating the operation handle) and to finely move the moving bases 20 and 21 to the contacting position, that is, move the moving bases 20 and 21 by the operation handles 26a and 26b. In this case, the fine and coarse movements can be switchingly performed.

The aforementioned clutch mechanism and operation handle 26 will be explained below by way of example.

Figure 7C:
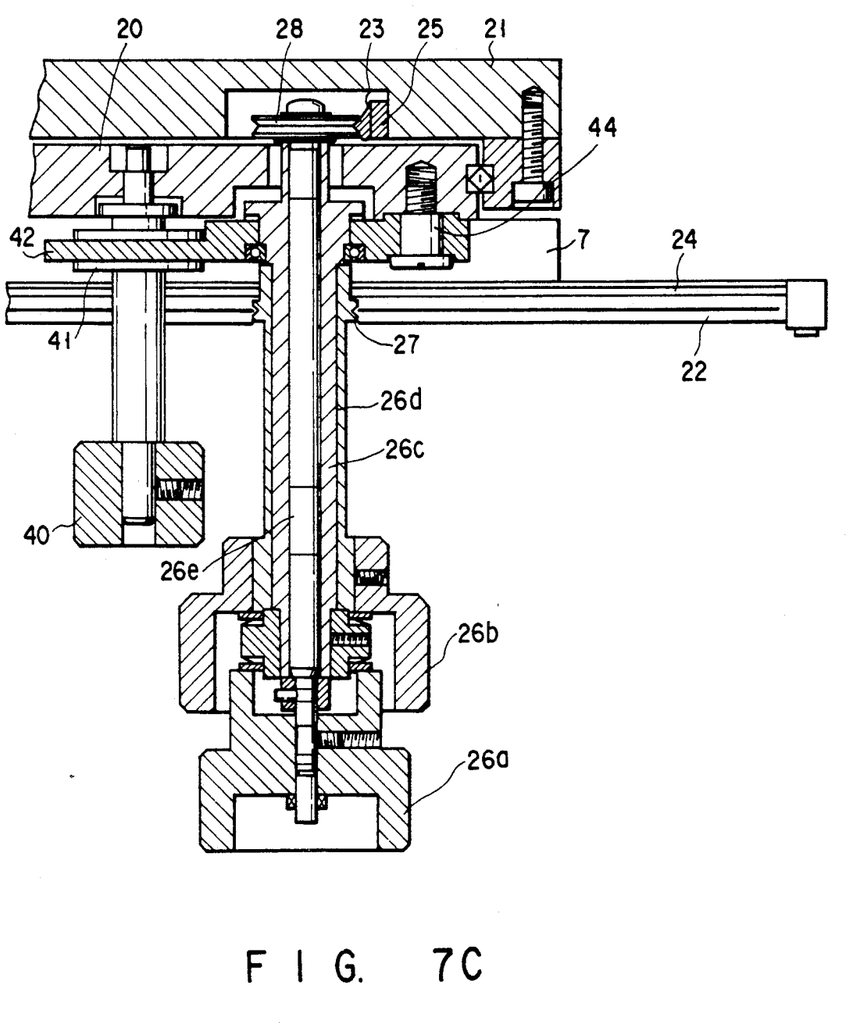

As shown in FIG. 7C, a handle seat 42 is mounted by a shaft 44 on a first moving base 20 and is rotatable with the shaft as a center. One end portion of a fixing cylinder 26c of the operation handle 26 is fixed to the moving base 20. A first handle 26a is rotatably mounted on the other end portion of the fixing cylinder 26c through a friction ring. One end of a rotation center shaft 26e is coaxially fixed on the first handle 26a. The other end of the rotation center shaft 26e extends through the fixing cylinder 26c and moving base 2D. A second drive wheel 28 is carried on the extending end or the center shaft 26e in a manner to face a second rail 23. A rotation cylinder 26d is rotatably and coaxially supported on the outer periphery of the fixing cylinder 26c. A first drive wheel 27 is coaxially formed on a portion of the outer periphery of the rotation cylinder 26d.

Figure 7D:
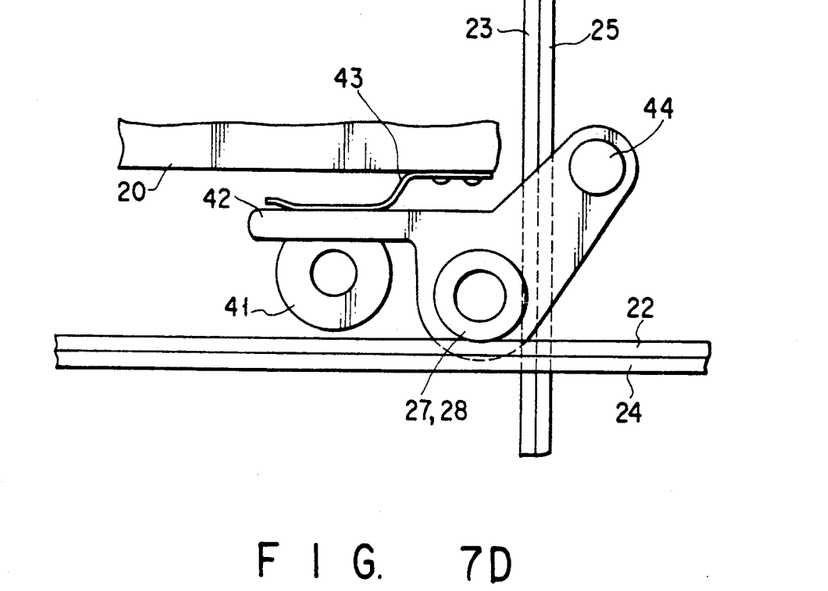
Figure 7E:
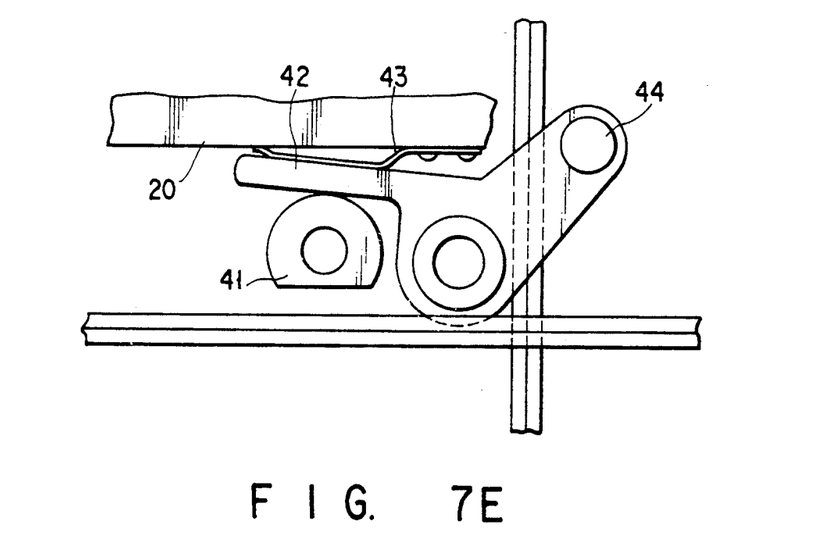

A clutch handle 40 has its one end rotatably supported at the first moving base 20 in a manner to extend in a direction parallel to the operation handle 26. As shown in FIGS. 7D and 7E, a cam 41 is fixed near one end of the clutch handle 40 such that it confronts the side face of the handle seat 42. The cam 41 has its disc section cut away as a cutout section in a straight line and is rotatable to a non-operative position where the cutout section does not act against the handle seat 42 in an opposed relation to the handle seat 42 as shown in FIG. 7D and to an operative position where the disc section acts upon the handle seat 42 in an opposed relation to the handle seat 42 as shown in FIG. 7E. In figures, reference numeral 45 shows a leaf spring whose one end is fixed to the moving base 20. The free end portion of the leaf spring 45 presses the side face of the handle seat 42 and, in FIGS. 7D and 7E, the handle seat 42 is swingably urged in a counterclockwise direction to enable it to be placed in pressure contact with the cam 41 at all times.

The operation of the aforementioned mechanism will be explained below.

When the cam 41 is brought to the non-operative position, as shown in FIG. 7D, through the rotation of the clutch handle 40, the cam 41 brings the handle seat 42 to the non-operative position so that the handle seat 42 is urged by the leaf spring 45 in the counterclockwise direction to enable drive wheels 27 and 28 to be placed in contact with rails 22 and 23. When, in such a contacting state, the first handle 26a is rotated, a second moving base 21 is moved in a Y direction relative to the first moving base 20. Similarly, when a second handle 26b is rotated, the first drive wheel 27 is rotated, enabling the moving base 20 to be moved in an X direction relative to the base 7. When, in this state, the clutch handle 40 is rotated through an angle of 180°, the cam 41 is brought to the operative position as shown in FIG. 7E and hence the cam 41 rotates the handle seat 42, in the clockwise direction, against an urging force of the leaf spring 45. As a result, the drive wheels 27 and 28 are brought out of engagement with the rails 22 and 23. In this no-operative state, the moving bases 21 and 20 are not moved even if the first and second handles 26a and 26b are rotated.

The present invention is effective in particular to a moving stage of such a type that the drive wheels are set in pressure contact with the corresponding rails at an area near an intersection of the rails in the X and Y directions.

Figure 8B:
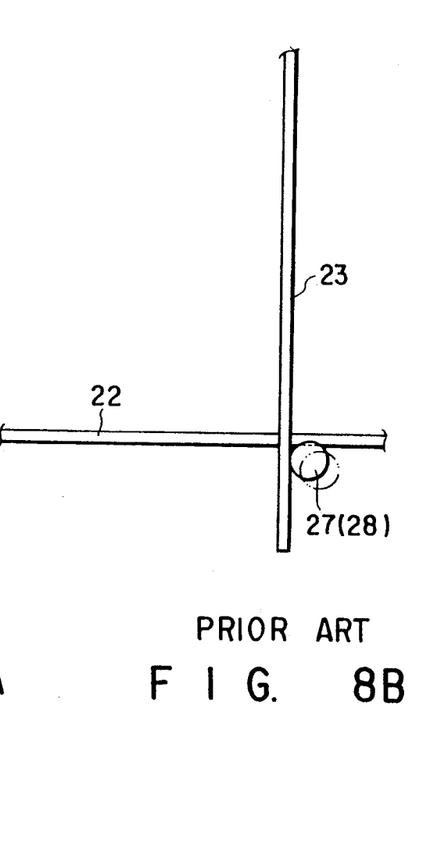

The reason is that, as shown in FIG. 8B, it is very difficult to set the two coaxial drive wheels 27 and 28 in contact with the rails 22 and 23 on the X and Y sides, respectively, under a uniform pressure.

Figure 8C:
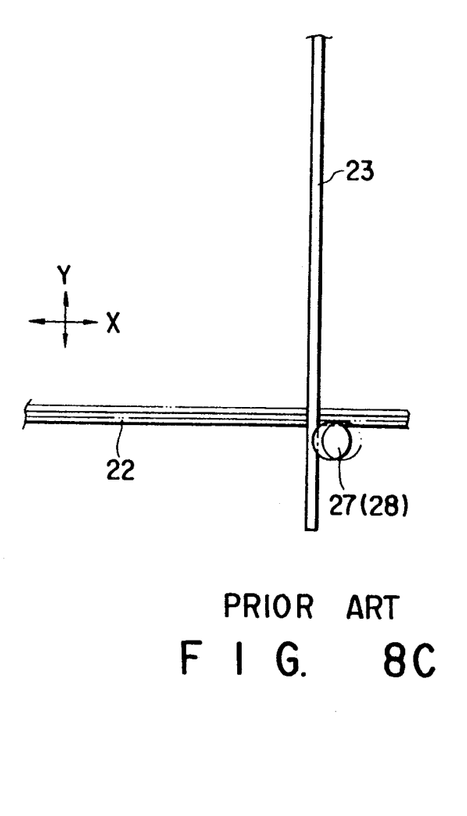

In order to improve such a structure, a clutch mechanism has been proposed as shown in FIG. 8C of Published Unexamined Japanese Patent Application 61-198206. The clutch mechanism is used to move the drive wheels 27 and 28 relative to on rail 23 and the drive wheels 27 and 28 relative to the other rail 22. In this arrangement, however, it is necessary to move, together with the rail 22, two drive wheels 27 and 28 mounted in a coaxial relation. However, the mechanism is undesirably complex and has higher manufacturing cost.

According to the present invention, as shown in FIG. 8A, since the elastic members 24 and 25 are arranged between the first and second rails 22 and 23 and the corresponding mount faces, respectively, it is not necessary to locate the drive wheels 27 and 28 at an exactly equal distance to the first and second rails 22 and 23. It is only necessary to set those drive wheels at a substantial equal distance to the first and second rails. It is also not necessary to exactly provide those rail mount faces.

Even if different pressure forces act upon the rails 22 and 23 when the drive wheels 24 and 25 are moved at a time of fine movement, the rails 22 and 23 and elastic members 24 and 25 undergo an elastic deformation, thus enabling the contact states of the drive wheels 27, 28 and first and second rails 22, 23 to be controlled substantially uniformly.

Figure 11A:
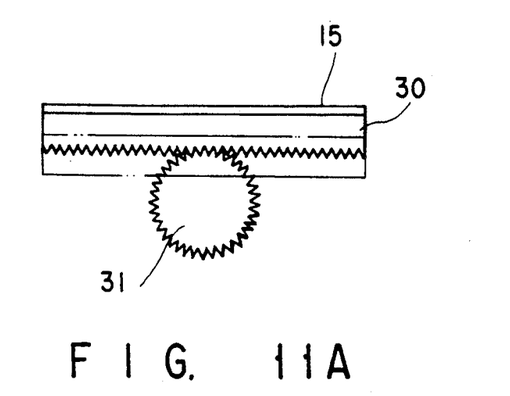
Figure 11B:
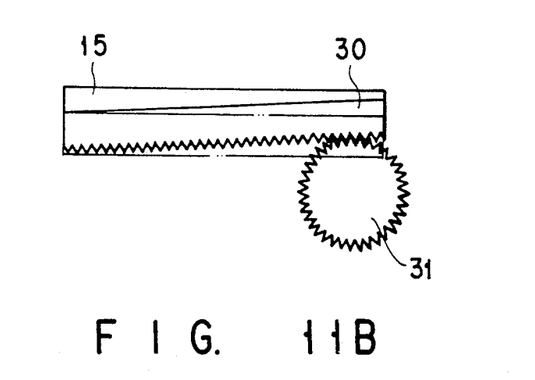

The present invention is effective for a rail of elastic nature. In a linear guide member of great rigidity, such as a rack 30, in the conventional art as shown in FIGS. 11A and 11B, the elastic force of the linear guide member considerably differs between where the drive member (pinion) 31 is situated near the middle of the linear guide member (rack) as shown in FIG. 11A and where the drive member is situated near the end of the linear guide member as shown in FIG. 11B. Even if a plate-like elastic member is mounted behind the linear guide member, the strength of contact between the drive member and the linear guide member differs due to such a considerable difference involved, failing to obtain the benefit of the present invention.

In the moving stage of the present invention, as set out above, the plate-like elastic member is placed between the rail and the rail mount face, enabling smooth movement of the moving base even in the case where the moving stage is of a larger type. As a result, a simpler moving stage can be manufactured at low costs without the need to improve the accuracy with which these component parts are manufactured and assembled together.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A moving stage comprising:
   a stage base;
   a moving base supported relative to the stage base such that the moving base is movable along a straight line;
   a rail supported on one of the stage base and the moving base, the rail extending in a direction that corresponds to a direction in which the straight line, extends, the rail comprising a wire;
   a drive wheel rotatably mounted on the other one of the stage base and the moving base on which the rail is not supported, said drive wheel having an outer peripheral surface in pressure contact with the rail; and
   elastic means, mounted uniformly on only said one of the stage base and the moving base so that the elastic means is positioned to be in uniform contact with and arranged between said one of the stage base and the moving base and the rail along a length of the rail, for uniformly elastically supporting the rail along the length of the rail that is in pressure contact with the drive wheel.

2. The moving stage according to claim 1, wherein: said elastic means comprises an elongated elastic member that extends along said straight line, said elongated elastic member having one elongated surface thereof in pressure contact with said one of the stage base and the moving base and having another elongated surface thereof in pressure contact with the rail.

3. The moving stage according to claim 2, further comprising a pair of fixing member for respectively fixing first and second end portions of the elongated elastic member to said one of the stage base and the moving base.

4. The moving stage according to claim 3, wherein each of said fixing members has a cut-out portion for respectively holding first and second end portions of the rail such that the rail is shiftable along the straight line.

5. The moving stage according to claim 1, further comprising operation means for rotating said drive wheel.

6. The moving stage according to claim 5, wherein said operation means has a handle rotatably mounted on the other one of the stage base and the moving base, said handle having a first end portion for supporting the drive wheel and having a second end portion projecting from said other one of the stage base and the moving base.

7. The mounting stage according to claim 2, wherein the elongated elastic member comprises an elongated elastic rubber member supported on said one of the stage base and the moving base.

8. The moving stage according to claim 7, wherein the rail has a substantially circular cross-section, and the drive wheel has a V-shaped groove formed in the outer peripheral surface thereof, the V-shaped groove receiving the rail therein so that the rail is in frictional contact with the drive wheel.

9. A moving stage comprising:
   a stage base;

a first moving base supported relative to the stage base such that the first moving base is receiprocably movable along a first straight line relative to the stage base;

a first rail supported on one of the stage base and the first moving base, said first rail extending in a direction that corresponds to a direction in which the straight line extends, said first rail comprising a wire;

a first drive wheel rotatably mounted on the other one of the stage base and the first moving base, said first drive wheel having an outer peripheral surface that is in pressure contact with the first rail;

first support means, mounted uniformly on only said one of the stage base and the first moving base so that the first support means is positioned to be in substantially uniform contact with and arranged between said one of said stage base and said first moving base and the first rail along a length of the first rail, for uniformly elastically supporting the first rail along the length of the first rail that is in pressure contact with the first drive wheel;

a second moving base supported on the first moving base, said second moving base being receiprocably movable along a second straight line that is orthogonal to the first straight line;

a second rail supported on one of the first and second moving bases so that the second rail extends along the second straight line;

said second rail comprising a wire;

a second drive wheel rotatably mounted on the other one of the first and second moving bases, said second drive wheel having an outer peripheral surface that is in pressure contact with the second rail; and second support means, mounted uniformly on only said one of the first and second moving bases, so that said second support means is positioned to be in substantially uniform contact with and between said one of the first and second moving bases and said second rail along a length of the second rail, for uniformly elastically supporting the second rail along the length of the second rail that is in pressure contact with the second drive wheel.

10. The moving stage according to claim 9, wherein:

said first support means includes a first elongated elastic member extending along said first straight line, the first elongated elastic member having a first elongated surface thereof in pressure contact with the first rail, the first elongated elastic member having a second elongated surface thereof in pressure contact with said one of the stage base and the first moving base; and said second support means includes a second elongated elastic member extending along said second straight line, the second elongated elastic member having a first elongated surface thereof in pressure contact with said one of the first and the second moving bases and having a second elongated surface thereof in pressure contact with the second rail.

11. The moving stage according to claim 10, further comprising operation means, supported coaxial with the first and second drive wheels, for allowing the first and second drive wheels to be rotated selectively.

* * * * *